US011849528B1

(12) United States Patent
Zhu et al.

(10) Patent No.: US 11,849,528 B1
(45) Date of Patent: Dec. 19, 2023

(54) IMPEDANCE MATCHING APPARATUS AND METHOD FOR SOLID-STATE MICROWAVE SOURCE

(71) Applicant: Hefei Institute of Physical Science, Chinese Academy of Sciences, Anhui (CN)

(72) Inventors: Liang Zhu, Anhui (CN); Wendong Ma, Anhui (CN); Mao Wang, Anhui (CN); Chengzhou Liu, Anhui (CN); Sheng Liu, Anhui (CN); Jiafang Shan, Anhui (CN)

(73) Assignee: Hefei Institute of Physical Science, Chinese Academy of Sciences, Hefei (CN)

( * ) Notice: Subject to any disclaimer, the term of this patent is extended or adjusted under 35 U.S.C. 154(b) by 0 days.

(21) Appl. No.: 18/116,284

(22) Filed: Mar. 1, 2023

(30) Foreign Application Priority Data

Aug. 4, 2022 (CN) .......................... 202210930182.7

(51) Int. Cl.
*H05B 6/68* (2006.01)
*H05B 6/70* (2006.01)

(52) U.S. Cl.
CPC .................................. *H05B 6/686* (2013.01)

(58) Field of Classification Search
CPC ........... H05B 6/686; H05B 6/687; H05B 6/68
USPC ....... 219/679, 690, 697, 709, 702, 704, 710, 219/712, 715, 680, 716, 770, 778
See application file for complete search history.

(56) References Cited

U.S. PATENT DOCUMENTS 5,521,360 A * 5/1996 Johnson ................. H05B 6/705
219/709
5,693,082 A 12/1997 Warner et al.
6,259,334 B1 7/2001 Howald
(Continued)

FOREIGN PATENT DOCUMENTS

CN 101494946 A 7/2009
CN 103025041 A 4/2013
(Continued)

OTHER PUBLICATIONS

Notice of Allowance of counterpart Chinese Patent Application No. 202210930182.7 dated Sep. 14, 2022.
(Continued)

*Primary Examiner* — Quang T Van

(57) ABSTRACT

Disclosed are an impedance matching apparatus and method for a solid-state microwave source. The impedance matching apparatus is connected to a solid-state microwave source and includes a detection module and a control module. The control module includes a frequency control unit and a power determining unit. The frequency control unit is configured to adjust a current frequency of a phase-locked source of the solid-state microwave source according to a received frequency modulation (FM) instruction. The power determining unit is configured to perform following steps: controlling a driver module of the solid-state microwave source to gradually increase a total incident power, and determining a change trend of a total reflected power of the solid-state microwave source; controlling the driver module to reduce the incident power; setting the FM instruction, and sending the set FM instruction to the frequency control unit.

10 Claims, 1 Drawing Sheet

(56) References Cited

U.S. PATENT DOCUMENTS

| | | | |
|---|---|---|---|
| 11,229,094 B2 * | 1/2022 | Ma | H05B 6/50 |
| 2013/0069737 A1 | 3/2013 | See et al. | |
| 2018/0062605 A1 | 3/2018 | Brounley et al. | |

FOREIGN PATENT DOCUMENTS

| | | | |
|---|---|---|---|
| CN | 108617044 A | 10/2018 | |
| CN | 110620322 A | 12/2019 | |
| CN | 114465592 A | 5/2022 | |

OTHER PUBLICATIONS

Hua Liu et al., Research on Microwave Automatic Impedance Matching System, Electronic Measurement Technology, Jun. 2007, pp. 40-42 and 65, vol. 30, No. 6.

Dong-Yu Liu et al., Research of Quadrature Signal Detection on Automatic Impedance Matching Machine, Instrumentation Technology, Aug. 2010, pp. 22-24 and 61, No. 8.

\* cited by examiner

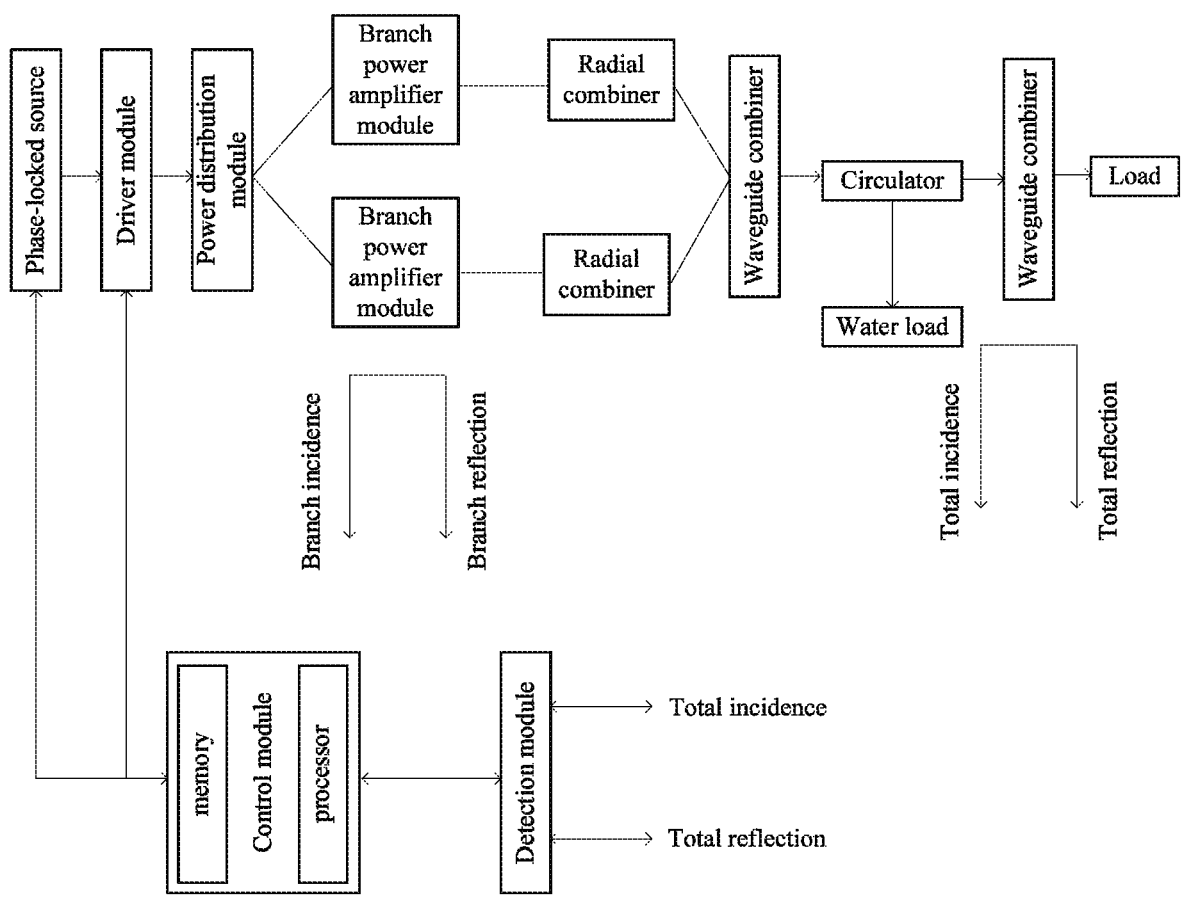

IMPEDANCE MATCHING APPARATUS AND METHOD FOR SOLID-STATE MICROWAVE SOURCE

CROSS REFERENCE TO RELATED APPLICATIONS

The present application claims the benefit of Chinese Patent Application No. 202210930182.7 filed on Aug. 4, 2022, the contents of which are incorporated herein by reference in their entirety.

TECHNICAL FIELD

The present disclosure relates to a technical field of solid-state microwave sources, and in particular, to an impedance matching apparatus and method for a solid-state microwave source.

BACKGROUND

A high-power solid-state microwave source is widely used in particle accelerators, diamond coating, plasma cleaning, and other scenarios. Specifically, the solid-state microwave source uses its microwave energy to excite particles such as a plasma to react. In this case, a load faced by the solid-state microwave source is the plasma.

As a concentration and a density of the plasma often change with a power of the solid-state microwave source, impedance of the plasma will also change accordingly, and the change is particularly obvious in an early stage of a microwave injection process. In this case, a serious impedance mismatch occurs and reflected power increases, which is very easy to damage the solid-state microwave source.

However, a conventional solid-state microwave source usually has a fixed frequency, and its frequency and power cannot be dynamically adjusted in real time based on a load change.

SUMMARY

To resolve at least one of the technical problems in the prior art, the present disclosure provides an impedance matching apparatus and method for a solid-state microwave source, so as to adjust a frequency and a power of a solid-state microwave source based on a matching status of load impedance.

According to a first aspect, the present disclosure provides an impedance matching apparatus for a solid-state microwave source, where the impedance matching apparatus is connected to a solid-state microwave source to control a frequency of the solid-state microwave source to match load impedance in real time; and the impedance matching apparatus includes a detection module and a control module, where the control module includes a frequency control unit and a power determining unit;

the frequency control unit is configured to adjust a current frequency of a phase-locked source of the solid-state microwave source according to a received frequency modulation (FM) instruction; and the power determining unit is configured to perform following steps responsive to the current frequency of the phase-locked source is adjusted:

controlling a driver module of the solid-state microwave source to gradually increase a total incident power, and determining a change trend of a total reflected power of the solid-state microwave source, where the reflected power is obtained by the detection module; and responsive to the change trend of the reflected power increases progressively and an increase does not reach a preset threshold, controlling the driver module to reduce the incident power; and setting the FM instruction according to a preset FM rule, and sending the set FM instruction to the frequency control unit.

As an improvement, the power determining unit is further configured to: responsive to the change trend of the reflected power increases progressively and the increase rate is greater than or equal to the preset threshold, control the driver module of the solid-state microwave source to cut off a radio frequency (RF) switch.

As an improvement, the power determining unit is further configured to: determine whether a branch reflected power of the solid-state microwave source reaches a pre-warning value, and if the branch reflected power of the solid-state microwave source reaches the pre-warning value, control the driver module of the solid-state microwave source to cut off an RF switch, where the branch reflected power of the solid-state microwave source is obtained by the detection module.

As an improvement, the detection module is further configured to sample a microwave signal of the solid-state microwave source, and convert the sampled microwave signal into an electrical signal.

According to a second aspect, the present disclosure further provides an impedance matching method applied to the impedance matching apparatus described in the first aspect, where the impedance matching method includes following steps:

adjusting, by a frequency control unit, a current frequency of a phase-locked source of a solid-state microwave source according to a received FM instruction; and performing, by a power determining unit, following steps when the current frequency of the phase-locked source is adjusted:

controlling a driver module of the solid-state microwave source to gradually increase a total incident power, and determining a change trend of a total reflected power of the solid-state microwave source, where the reflected power is obtained by a detection module; and responsive to the change trend of the reflected power increases progressively and an increase does not reach a preset threshold, controlling the driver module to reduce the incident power; and setting the FM instruction according to a preset FM rule, and sending the set FM instruction to the frequency control unit.

As an improvement, responsive to the change trend of the reflected power increases progressively and the increase rate is greater than or equal to the preset threshold, the driver module of the solid-state microwave source is controlled the to cut off an RF switch.

As an improvement, the preset threshold is 30% of a total rated power of the solid-state microwave source.

As an improvement, the FM rule includes: reducing a current frequency of the solid-state microwave source based on a preset step size.

As an improvement, the power determining unit further performs following steps:

determining whether a branch reflected power of the solid-state microwave source reaches a pre-warning value, and if the branch reflected power of the solid-state microwave source reaches the pre-warning value, controlling the driver module of the solid-state microwave source to cut off an RF switch, where the branch reflected power of the solid-state microwave source is obtained by the detection module.

Compared with the prior art, the impedance matching apparatus and method provided in the present disclosure at least have following beneficial effects:

Based on a characteristic that power and frequency switches of a solid-state microwave circuit are adjustable, the present disclosure dynamically adjusts the power and the frequency by determining a matching status of the load impedance of the solid-state microwave source in real time, so as to ensure device safety of the solid-state microwave source.

BRIEF DESCRIPTION OF THE DRAWINGS

To describe the technical solutions in the present disclosure more clearly, the following briefly describes the accompanying drawings required for describing the implementations. Apparently, the accompanying drawings in the following description show merely some implementations of the present disclosure, and a person of ordinary skill in the art may further derive other drawings from these accompanying drawings without creative efforts.

The sole FIGURE is a schematic structural diagram of a solid-state microwave source and an impedance matching apparatus according to an embodiment of the present disclosure.

DETAILED DESCRIPTION

The specific embodiments of the present disclosure will be described in detail below. The preferred embodiments of the present disclosure are shown in the accompanying drawings. The accompanying drawings are intended to supplement the description of the textual part of the specification with graphics, so as to make the technical features and overall technical solution of the present disclosure vividly understood. However, these accompanying drawings should not be understood as a limitation to the protection scope of the present disclosure.

According to a first aspect, an embodiment of the present disclosure provides an impedance matching apparatus for a solid-state microwave source. The impedance matching apparatus is connected to a solid-state microwave source to control a frequency of the solid-state microwave source to match load impedance in real time.

Specifically, the impedance matching apparatus includes a detection module and a control module. The control module includes a processor, and the processor is configured to execute a frequency control unit and a power determining unit that are stored in a memory.

The frequency control unit is configured to adjust a current frequency of a phase-locked source of the solid-state microwave source according to a received FM instruction.

The power determining unit is configured to perform following steps responsive to the current frequency of the phase-locked source is adjusted:

controlling a driver module of the solid-state microwave source to gradually increase a total incident power, and determining a change trend of a total reflected power of the solid-state microwave source, where the reflected power is obtained by the detection module; responsive to the change trend of the reflected power increases progressively and an increase does not reach a preset threshold, controlling the driver module to reduce the incident power; and setting the FM instruction according to a preset FM rule, and sending the set FM instruction to the frequency control unit.

Specifically, the FM rule includes reducing a current frequency of the solid-state microwave source based on a preset step size.

In an embodiment, the FM rule may be set as adjusting an operating frequency of the solid-state microwave source in a low-frequency direction based on a step size of 1 MHz.

Preferably, the operating frequency of the solid-state microwave source in this embodiment ranges from 2.4 G to 2.5 G.

In this embodiment, the power determining unit is further configured to: when the change trend of the total reflected power increases progressively and the increase rate is greater than or equal to the preset threshold, control the driver module of the solid-state microwave source to cut off an RF switch to ensure device safety.

Specifically, the total incident power shall not exceed 10% of a rated power of the solid-state microwave source in an initial adjustment stage, and shall not exceed 20% of the rated power in a later adjustment stage. The preset threshold may be set to 30% of the rated power.

It can be understood that when the total reflected power decreases or remains unchanged with an increase of the incident power, a microwave frequency matches the load impedance, and the current microwave frequency is a resonant frequency.

Specifically, the detection module is configured to sample a microwave signal of the solid-state microwave source, and convert the sampled microwave signal into an electrical signal to be transmitted to the control module.

Based on a characteristic that power and frequency switches of a solid-state microwave circuit are adjustable, the present disclosure can adjust the power and the frequency of the solid-state microwave source in real time based on a matching status of the load impedance, so as to ensure the device safety.

Preferably, as shown in the sole FIGURE, the impedance matching apparatus provided in the present disclosure may be connected to a following solid-state microwave source for application.

The solid-state microwave source includes a phase-locked source, a driver module, a power distribution module, a plurality of branch power amplifier modules, a plurality of radial combiners, a waveguide combiner, a circulator, and a waveguide coupler that are connected in turn.

The branch power amplifier modules each are connected to the power distribution module by using an amplitude and phase stable cable.

In this embodiment, another terminal of the circulator is also connected to a water load to absorb a reflected power in the case of mismatched load impedance.

It can be understood that the driver module has an RF switch and an attenuation adjustment function, and its power output is greater than or equal to 0.3 dB, which can meet an output requirement of the power distribution module.

Specifically, the driver module realizes a steady-state output and a pulse output by controlling the RF switch, so as to provide rapid protection in the case of a serious load mismatch or a failure of the branch power amplifier module. The attenuation adjustment function can perform frequency and power adjustment based a load matching status.

The power distribution module is a passive device, which is designed with 1×16 ports. For each port, an output power is ±0.1 dB; and output phase consistency is ≤±5°.

A power of the branch power amplifier module is ≥900 W, and flatness within a bandwidth is ≤0.3 dB. The branch power amplifier module has a phase adjustment function and an amplitude adjustment function.

It should be noted that the branch power amplifier module has undergone phase consistency adjustment before and after being assembled.

In this embodiment, 2N branch power amplifier modules may be disposed, where N=1, 2, 3, 4, 5, 6, 9.

In this embodiment, considering that it is difficult to increase a power capacity of the solid-state microwave source at a higher operating frequency (≥2.45 G), a plurality of branch power amplifier modules are disposed and are combined with radial combiners connected to these branch power amplifier modules, so as to achieve a higher power.

Specifically, the radial combiner can withstand a power of 10 KW, and its input port is a DIN head. A quantity of radial combiners matches a quantity of branch power amplifier modules. The radial combiner has one output port, which may be a BJ22, BJ9 or BJ26 waveguide.

Correspondingly, input and output ports of the waveguide combiner are in a same form as the output port of the radial combiner, and the waveguide combiner has 2 input ports and one output port.

It can be understood that the waveguide combiner has a certain bandwidth, and flatness within the bandwidth is ≤0.3 dB.

The circulator is configured to avoid a permanent damage to the front-end radial combiner due to an excessive reflected power. The water load is configured to absorb the reflected power. Both the circulator and the water load belong to the prior art, and are not described herein.

When the impedance matching apparatus provided in the present disclosure is used for the above solid-state microwave source, the detection module specifically obtains the total incident power and the total reflected power of the solid-state microwave source by using the waveguide coupler and converts them into electrical signals to be transmitted to the control module.

The frequency control unit in the control module first controls the phase-locked source to set an initial operating frequency. At this time, the power determining unit determines a change of a total power; when a determining result is mismatched with the load impedance, sets the FM instruction to re-adjust the operating frequency of the phase-locked source by using the frequency control unit; and then repeatedly determines the matching status of the load impedance until the microwave frequency matches the load impedance.

It can be understood that the power determining unit finally determines the resonant frequency by repeatedly determining the total reflected power for each adjusted operating frequency.

It should be noted that the power determining unit is further configured to: determine whether a branch reflected power of the solid-state microwave source reaches a pre-warning value, and if the branch reflected power of the solid-state microwave source reaches the pre-warning value, control the driver module to cut off the RF switch to ensure the device safety.

According to a second aspect, the present disclosure further provides an impedance matching method applied to the impedance matching apparatus described in the first aspect. The impedance matching method includes the following steps:

S1: A frequency control unit in the impedance matching apparatus adjusts a current frequency of a phase-locked source of a solid-state microwave source according to a received FM instruction; and when the current frequency of the phase-locked source is adjusted, a power determining unit in the impedance matching apparatus performs a following step S2.

S2: Control a driver module of the solid-state microwave source to gradually increase a total incident power, and determine a change trend of a total reflected power of the solid-state microwave source, where the reflected power is obtained by a detection module.

S3: Responsive to the change trend of the total reflected power increases progressively and an increase does not reach a preset threshold, control the driver module to reduce the incident power; set the FM instruction according to a preset FM rule, and send the set FM instruction to the frequency control unit; and repeatedly perform the steps S1 to S3 until a microwave frequency matches load impedance.

It can be understood that when the total reflected power decreases or remains unchanged with an increase of the incident power, the microwave frequency matches the load impedance, and the current microwave frequency is a resonant frequency.

In this embodiment, the step S2 further includes: determining whether a branch reflected power of the solid-state microwave source reaches a pre-warning value, and if the branch reflected power of the solid-state microwave source reaches the pre-warning value, controlling the driver module of the solid-state microwave source to cut off an RF switch. Responsive to the change trend of the total reflected power of the solid-state microwave source increases progressively and the increase rate is greater than or equal to the preset threshold, the driver module of the solid-state microwave source also needs to be controlled to cut off the RF switch.

Specifically, the total incident power shall not exceed 10% of a rated power of the solid-state microwave source in an initial adjustment stage, and shall not exceed 20% of the rated power in a later adjustment stage. The preset threshold may be set to 30% of the rated power.

Since the above impedance matching method is based on a same concept as the embodiment of the impedance matching apparatus described in the first aspect of the present disclosure, reference may be made to the description in the apparatus embodiment of the present disclosure for more details, and details are not described herein again.

The technical features of the foregoing embodiments can be employed in arbitrary combinations. For brevity of description, not all possible combinations of the technical features of the foregoing embodiments are described. However, the combinations of the technical features should be construed as falling within the scope described in this specification as long as there is no contradiction in the combinations.

The invention claimed is:

1. An impedance matching apparatus for a solid-state microwave source, wherein the impedance matching apparatus is connected to a solid-state microwave source to control a frequency of the solid-state microwave source to match load impedance in real time; and the impedance matching apparatus comprises a detection module and a control module, wherein the control module comprises a processor, and the processor is configured to run a frequency control unit and a power determining unit that are stored in a memory;

the frequency control unit is configured to adjust a current frequency of a phase-locked source of the solid-state microwave source according to a received frequency modulation (FM) instruction; and the power determining unit is configured to perform following steps responsive to the current frequency of the phase-locked source is adjusted:

controlling a driver module of the solid-state microwave source to gradually increase a total incident power, and determining a change trend of a total reflected power of the solid-state microwave source, wherein the reflected power is obtained by the detection module;

responsive to the change trend of the reflected power increases progressively and an increase does not reach a preset threshold, controlling the driver module to reduce the incident power; and setting the FM instruction according to a preset FM rule, and sending the set FM instruction to the frequency control unit.

2. The impedance matching apparatus according to claim 1, wherein the power determining unit is further configured to:

responsive to the change trend of the reflected power increases progressively and the increase is greater than or equal to the preset threshold, control the driver module of the solid-state microwave source to cut off a radio frequency (RF) switch.

3. The impedance matching apparatus according to claim 1, wherein the power determining unit is further configured to:

determine whether a branch reflected power of the solid-state microwave source reaches a pre-warning value, and if the branch reflected power of the solid-state microwave source reaches the pre-warning value, control the driver module of the solid-state microwave source to cut off an RF switch, wherein the branch reflected power of the solid-state microwave source is obtained by the detection module.

4. The impedance matching apparatus according to claim 1, wherein the detection module is further configured to:

sample a microwave signal of the solid-state microwave source, and convert the sampled microwave signal into an electrical signal.

5. An impedance matching method based on the impedance matching apparatus according to claim 1, comprising following steps:

adjusting, by a frequency control unit, a current frequency of a phase-locked source of a solid-state microwave source according to a received FM instruction; and performing, by a power determining unit, following steps responsive to the current frequency of the phase-locked source is adjusted:

controlling a driver module of the solid-state microwave source to gradually increase a total incident power, and determining a change trend of a total reflected power of the solid-state microwave source, wherein the reflected power is obtained by a detection module;

responsive to the change trend of the reflected power increases progressively and an increase does not reach a preset threshold, controlling the driver module to reduce the incident power; and setting the FM instruction according to a preset FM rule, and sending the set FM instruction to the frequency control unit.

6. The impedance matching method according to claim 5, wherein responsive to the change trend of the reflected power increases progressively and the increase is greater than or equal to the preset threshold, the driver module of the solid-state microwave source is controlled to cut off an RF switch.

7. The impedance matching method according to claim 5, wherein the preset threshold is 30% of a total rated power of the solid-state microwave source.

8. The impedance matching method according to claim 6, wherein the preset threshold is 30% of a total rated power of the solid-state microwave source.

9. The impedance matching method according to claim 5, wherein the FM rule comprises: reducing a current frequency of the solid-state microwave source based on a preset step size.

10. The impedance matching method according to claim 5, wherein the power determining unit further performs following steps:

determining whether a branch reflected power of the solid-state microwave source reaches a pre-warning value, and if the branch reflected power of the solid-state microwave source reaches the pre-warning value, controlling the driver module of the solid-state microwave source to cut off an RF switch, wherein the branch reflected power of the solid-state microwave source is obtained by the detection module.

* * * * *